(12) United States Patent
Ryu

(10) Patent No.: US 10,661,771 B2
(45) Date of Patent: May 26, 2020

(54) ELECTRONIC PARKING BRAKE SYSTEM FOR VEHICLE AND DRIVING METHOD THEREOF

(71) Applicant: MANDO CORPORATION, Pyeongtaek-si, Gyeonggi-do (KR)

(72) Inventor: Kwang Hyun Ryu, Hanam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/605,368

(22) Filed: May 25, 2017

(65) Prior Publication Data

US 2017/0349154 A1 Dec. 7, 2017

(30) Foreign Application Priority Data

Jun. 3, 2016 (KR) .................. 10-2016-0069571

(51) Int. Cl.
*B60T 8/72* (2006.01)
*B60T 13/74* (2006.01)
*B60T 7/12* (2006.01)
*B60T 8/172* (2006.01)
*B60T 8/32* (2006.01)

(52) U.S. Cl.
CPC ............ *B60T 8/72* (2013.01); *B60T 7/12* (2013.01); *B60T 8/172* (2013.01); *B60T 8/321* (2013.01); *B60T 13/74* (2013.01); *B60T 13/741* (2013.01)

(58) Field of Classification Search
USPC ........................................... 701/70
See application file for complete search history.

(56) References Cited

U.S. PATENT DOCUMENTS

2004/0113489 A1* 6/2004 Iwagawa ............. B60T 7/107
303/155

FOREIGN PATENT DOCUMENTS

KR 2010-0039641 A 4/2010
KR 20100039641 A * 4/2010

* cited by examiner

*Primary Examiner* — Maceeh Anwari
(74) *Attorney, Agent, or Firm* — Morgan, Lewis & Bockius LLP

(57) ABSTRACT

Disclosed herein are an electronic parking brake system for a vehicle and a method of driving the system, which are capable of stopping the vehicle when the operation of a vehicle service brake is impossible during the travel of the vehicle. The electronic parking brake system for the vehicle includes a controller that stores a control value of a parking brake for decelerating the vehicle to a target deceleration and outputs a braking command including the control value of the parking brake, and an electronic parking brake that generates a clamping force based on a braking command inputted from the controller.

11 Claims, 3 Drawing Sheets

[FIG. 1]
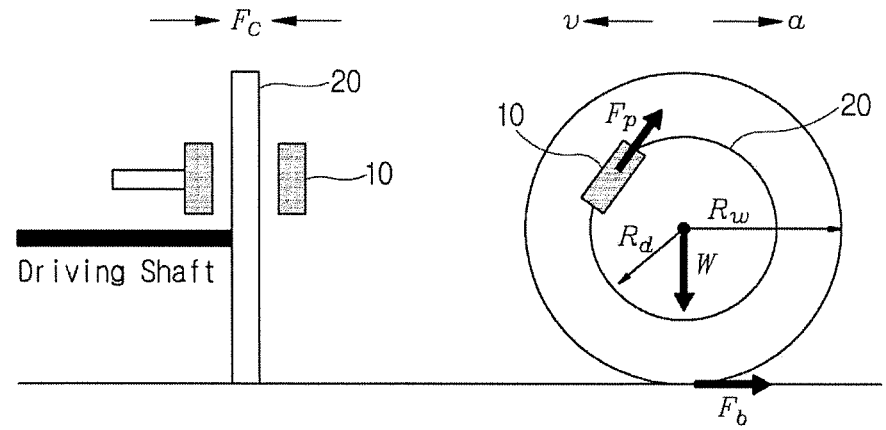
[FIG. 2]
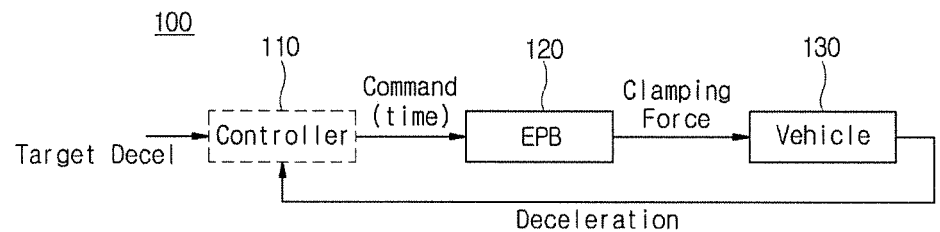
[FIG. 3]
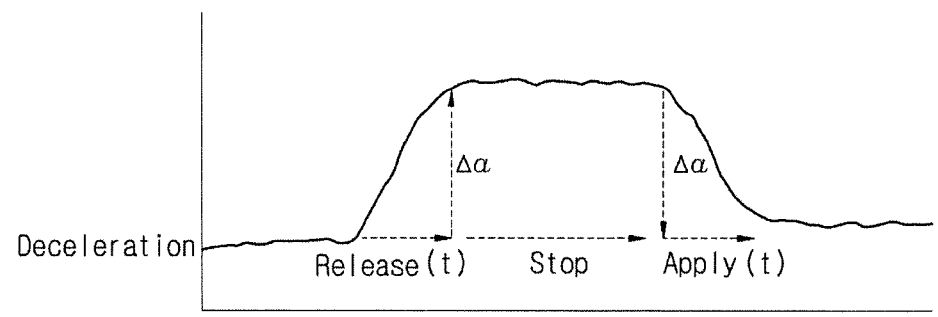

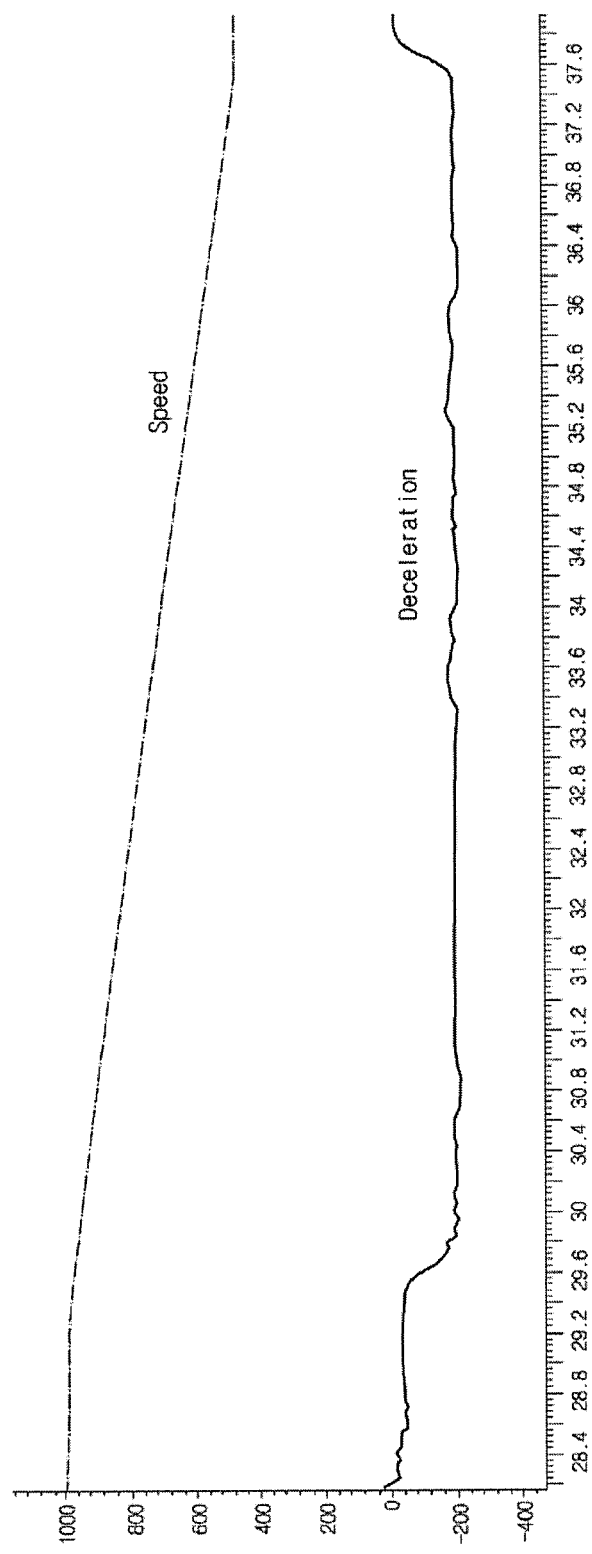
[FIG. 4]

[FIG. 5]
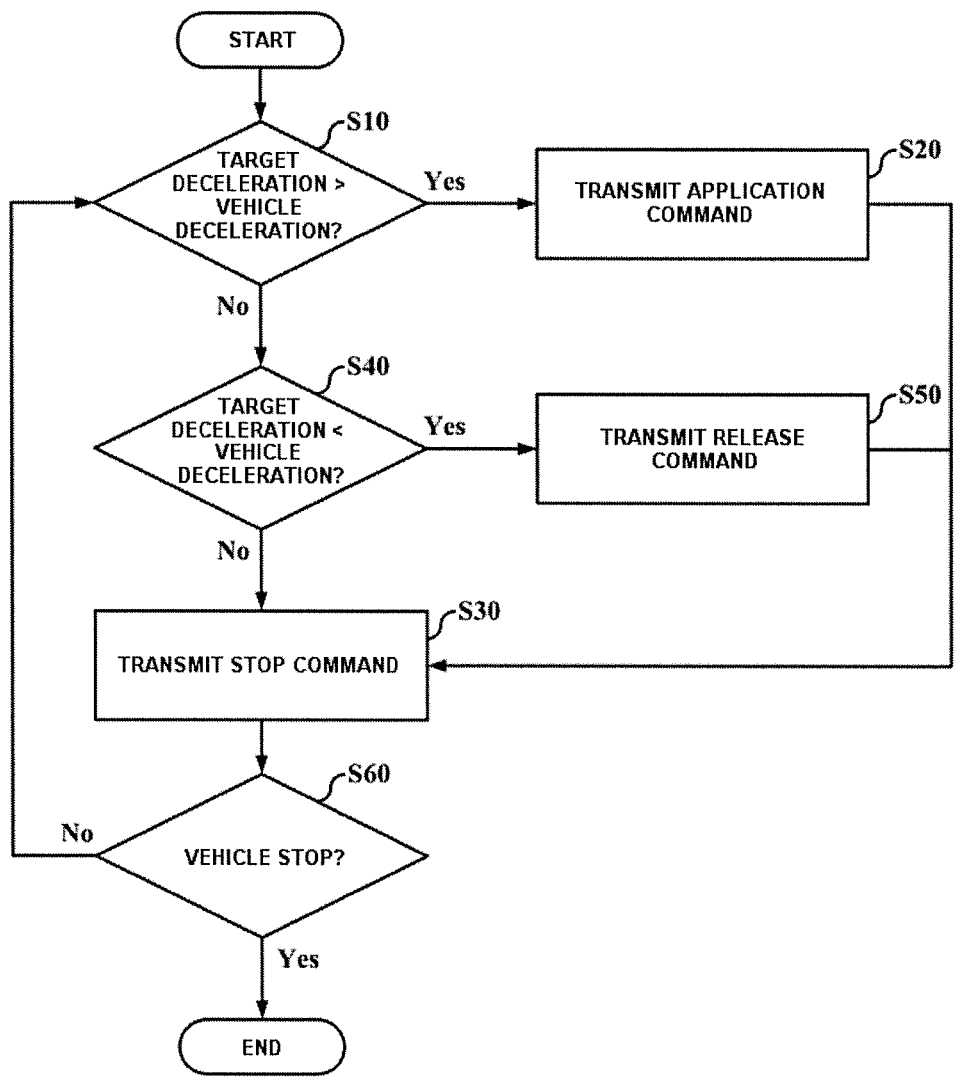

ELECTRONIC PARKING BRAKE SYSTEM FOR VEHICLE AND DRIVING METHOD THEREOF

CROSS-REFERENCE TO RELATED APPLICATION(S)

This application claims priority to Korean Patent Application No(s). 10-2016-0069571, filed on Jun. 3, 2016, the disclosure of which is incorporated herein by reference in its entirety.

BACKGROUND OF THE INVENTION

Field of the Invention

Exemplary embodiments of the present invention relate to an electronic parking brake system for a vehicle, and more particularly, to an electronic parking brake system for a vehicle and a method of driving the system, which are capable of stopping the vehicle when the operation of a vehicle service brake is impossible during the travel of the vehicle.

Description of the Related Art

An electronic parking brake system that improves a wire type parking brake system has been employed. The electronic parking brake system determines the speed of a vehicle, the rotation of an engine, and the operation of a brake by an electronic control unit (ECU) when the vehicle stops, thus causing the brake to be driven. Thus, even if a driver does not apply the brake while the vehicle stops, there is no possibility that the brake is released. Meanwhile, when the vehicle starts to run, the brake is automatically released from a locked state merely by pressing on an accelerator pedal. Thereby, even when the vehicle starts on a slope, the vehicle is not pushed backwards. Further, even when there is a severe traffic jam, the vehicle moves forwards only when a driver increases the speed. Consequently, it is unnecessary for the driver to frequently press on the accelerator pedal. During the travel of the vehicle, the ECU detects the vehicle speed and recognizes that the vehicle is moving, so that the electronic parking brake system does not work while the vehicle is running. However, the electronic parking brake should have the function of stopping the vehicle that is running, in the event that the operation of the service brake is impossible. Such a conventional electronic parking brake system is problematic in that a control value is tuned by repetitive experiments, so that a lot of time and money is required to tune the control value.

PRIOR ART DOCUMENT

Patent Document (Patent Document 1) Korean Patent Unexamined Publication No. 10-2010-0039641 (Electronic parking brake system and method of controlling the same)

SUMMARY OF THE INVENTION

In accordance with one aspect of the present invention, there is provided an electronic parking brake system for a vehicle, including a controller outputting a braking command including a control value of a parking brake for decelerating the vehicle to a target deceleration; and an electronic parking brake generating a clamping force based on the braking command inputted from the controller, wherein the controller controls a command transmission time required to transmit the braking command, thus determining the clamping force.

The command transmission time may be a time when the braking command may be maintained until a vehicle deceleration may become identical to the target deceleration.

The command transmission time may be determined by multiplying a difference value between the target deceleration and the vehicle deceleration and the control value.

A variation of the clamping force may be in proportion to the command transmission time.

The control value of the electronic parking brake may be generated using an effective radius of a brake disk, a radius of a wheel, a friction coefficient between a brake pad and the brake disk, and a friction coefficient between a tire and a road, and the control value of the electronic parking brake may be stored in the controller.

The braking command outputted from the controller may include one of brake application, brake release or brake stop.

In the case of the brake application, a variation of the clamping force in a positive direction may increase as the command transmission time may increase, and in the case of the brake release, a variation of the clamping force in a negative direction may increase as the command transmission time may increase.

The controller may apply the brake application when the vehicle may be decelerated to the target deceleration, may apply the brake release when the vehicle deceleration may be reduced, and may apply the brake stop when the vehicle deceleration may be identical to the target deceleration.

In accordance with another aspect of the present invention, a method of driving an electronic parking brake system for a vehicle, including obtaining a control value of a parking brake for decelerating the vehicle to a target deceleration; determining a type of a braking command and a command transmission time of the braking command using a difference value between a vehicle deceleration and the target deceleration and the control value; outputting the braking command according to the type of the braking command and the command transmission time of the braking command that have been determined; and generating a clamping force in an electronic parking brake based on the braking command.

The method may further include outputting the braking command to the electronic parking brake until the vehicle deceleration may become identical to the target deceleration by controlling the command transmission time.

In the determining the type of the braking command, if the target deceleration is less than the vehicle deceleration, this may be determined as a brake release command, and if the target deceleration is more than the vehicle deceleration, this may be determined as a brake application command.

In the determining the command transmission time of the braking command, the target deceleration may be determined by multiplying the difference value of the vehicle deceleration and the experimentally obtained control value.

The electronic parking brake system for the vehicle and the method of driving the system according to an embodiment of the present invention allow the control value of the electronic parking brake to be set depending on the characteristics of the vehicle.

Further, the electronic parking brake system for the vehicle and the method of driving the system according to an embodiment of the present invention allow time and cost required to tune the control value of the electronic parking brake to be reduced.

According to an embodiment of the present invention, it is possible to obtain a command transmission time through a control value representing the characteristics of the vehicle, and a difference value between a target deceleration and a vehicle deceleration. The vehicle deceleration and the target deceleration are continuously checked via the command transmission time, so that the vehicle deceleration and the target deceleration are measured at a time when a control operation is started without the necessity of adjusting a clamping force, thus controlling the electronic parking brake such that the target deceleration is identical to the vehicle deceleration.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating the generation of a braking force by an electronic parking brake;

FIG. 2 is a view illustrating an electronic parking brake system according to an embodiment of the present invention;

FIG. 3 is a view illustrating experimental data on a real vehicle for determining time that is required to obtain a desired reduction in speed by creating friction between a brake pad and a brake disk;

FIG. 4 is a view illustrating results of dynamic braking experiments using the electronic parking brake system according to the embodiment of the present invention; and FIG. 5 is a view illustrating a method of driving an electronic parking brake system according to an embodiment of the present invention.

DESCRIPTION OF SPECIFIC EMBODIMENTS

Embodiments of the present invention will be described in detail below with reference to the accompanying drawings. It would be understood by one of ordinary skill in the art that a variety of equivalents and modifications of the embodiments exist without departing from the scope of the invention.

Furthermore, in the drawings, portions which are not related to the present invention will be omitted to explain the present invention more clearly. Reference should be made to the drawings, in which similar reference numerals are used throughout the different drawings to designate similar components.

It will be understood that when an element is referred to as being "coupled" or "connected" to another element, it can be directly coupled or connected to the other element or intervening elements may be present therebetween. In addition, when an element is referred to as "comprising" or "including" a component, it does not preclude another component but may further include the other component unless the context clearly indicates otherwise.

It will be understood that when an element is referred to as being "on" another element, it can be directly on another element or intervening elements may be present therebetween. In contrast, when an element is referred to as being "directly on" another element, there are no intervening elements therebetween.

It will be understood that, although the terms first, second, third, etc. may be used herein to describe various elements, components, regions, layers and/or sections, but are not limited thereto. These terms are only used to distinguish one element, component, region, layer, or section from another element, component, region, layer, or section. Therefore, a first element, component, region, layer, or section discussed below could be termed a second element, component, region, layer, or section without departing from the teachings of the present invention.

The technical terms used in the present specification are set forth to mention a specific embodiment of the present invention, and do not intended to define the scope of the present invention. As used herein, the singular forms "a", "an" and "the" are intended to include the plural forms as well, unless the context clearly indicates otherwise. In the present specification, the term "including" is intended to embody specific properties, regions, integers, steps, operations, elements and/or components, but is not intended to exclude presence or addition of other properties, regions, integers, steps, operations, elements, components and/or groups.

Spatially relative terms, such as "below", "above", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the drawings. For example, if the device in the figures is turned over, elements described as "below" other elements or features would then be oriented "above" the other elements or features. Therefore, the exemplary term "below" can encompass both an orientation of above and below. Devices may be otherwise rotated 90 degrees or at other angles and the spatially relative descriptors used herein interpreted accordingly.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a view illustrating the generation of a braking force by an electronic parking brake.

Referring to FIG. 1, if an electronic parking brake (EPB) system is driven while a vehicle is running, a brake pad 10 comes into contact with a brake disk 20, thus causing friction and thereby generating a braking force. The braking force may be determined by a clamping force $F_C$ meaning a force of the brake pad 10 for clamping the brake disk 20, and vehicle deceleration a.

Here, the EPB dynamic braking is intended to decelerate the vehicle (vehicle deceleration a) by generating the clamping force $F_C$ in the running vehicle using the EPB system.

Thus, the present invention utilizes a relation between the clamping force $F_C$ and the vehicle deceleration a and assumes the following three items, for the purpose of deceleration control based on an EPB model.

1. no slip occurs between a tire and a road.
2. contact between the brake pad and the brake disk is maintained.
3. the vehicle is being run.

FIG. 2 is a view illustrating an electronic parking brake system according to an embodiment of the present invention.

Referring to FIG. 2, an electronic parking brake system 100 according to the embodiment of the present invention includes a controller 110, and an electronic parking brake 120.

The controller 110 gives a braking command to the electronic parking brake 120 for a preset period of time. The electronic parking brake 120 generates a clamping force $F_C$ based on the braking command inputted from the controller 110 to decelerate a vehicle 130. Information about the deceleration of the vehicle 130 is fed back to the controller 110. The controller 110 maintains the clamping force $F_C$ until the vehicle is decelerated to target deceleration.

In this regard, the braking command generated in the controller 110 and the magnitude of the clamping force $F_C$ are based on the following Equations 1 to 9.

Hereinafter, constants and variables described in Equations 1 to 9 are defined with reference to the following table 1.

TABLE 1

| | |
|---|---|
| $F_c$ | clamping force |
| $F_b$ | braking force |
| $F_p$ | friction force between pad and disk |
| $R_w$ | wheel radius |
| $R_d$ | effective radius |
| $\mu_p$ | friction coefficient between pad and disk |
| $\mu_b$ | friction coefficient between tire and road |
| $\alpha$ | vehicle deceleration |

First, a force generating the braking force, that is, a friction force $F_P$ between the brake pad and the brake disk will be represented by the following Equation 1.

$$F_p = \mu_p F_c \quad \text{[Equation 1]}$$

In Equation 1, $\mu_p$ denotes the friction coefficient between the brake pad 10 and the brake disk 20, and $F_C$ means the clamping force.

The friction force between the tire and the road may be represented by the following Equation 2.

$$F_b = \mu_b W \quad \text{[Equation 2]}$$

In Equation 2, $F_b$ denotes a braking force, $\mu_b$ denotes a friction coefficient between the tire and the road, and W denotes a force acting vertically on the brake disk 20. In this regard, assuming that there is no slip between the tire and the road, the vehicle deceleration a is equal to the friction coefficient $\mu_b$ between the tire and the road ($a = \mu_b$), so that the braking force $F_b$ may be represented by the following Equation 3.

$$F_b = aW \quad \text{[Equation 3]}$$

In Equation 3, a means the vehicle deceleration. Further, the formation of a moment $M_o$ at the center of the tire may be represented by the following Equations 4 and 5.

$$\Sigma M_o = F_b R_w - F_p R_d \quad \text{[Equation 4]}$$

$$F_b = F_p \times R_w / R_d \quad \text{[Equation 5]}$$

In Equations 4 and 5, $R_d$ denotes the effective radius of the brake disk 20, $R_w$ denotes the wheel radius, $F_b$ denotes the braking force, and $F_p$ denotes the friction force between the brake pad 10 and the brake disk 20.

If Equation 5 is substituted for Equation 3, the clamping force $F_C$ may be expressed as in the following Equation 6, namely, Equation for the deceleration.

$$F_c = \frac{WR_d}{\mu_p R_w} a \quad \text{[Equation 6]}$$

Since the vehicle 130 is decelerated by the clamping force $F_C$, input is the clamping force $F_C$ and output is deceleration in terms of the vehicle 130. Here, the braking command may include brake application, brake release, and brake stop, and the braking command is converted into the clamping force $F_C$. Since a variation of the clamping force $F_C$ is in proportion to the command transmission time t of the braking command, it may be represented by the following Equation 7.sks $$\Delta F_c = K_t t \quad \text{[Equation 7]}$$

If the above-mentioned Equation 6 is converted into the following Equation 8 and Equation 8 is substituted for Equation 7, equations for the braking command and the deceleration may be obtained as in the following Equation 9.

$$\Delta F_c = \frac{WR_d}{\mu_p R_w} \Delta a \quad \text{[Equation 8]}$$

$$t = \frac{1}{K_t} \frac{WR_d}{\mu_p R_w} \Delta a \quad \text{[Equation 9]}$$

In Equations 8 and 9, $R_d$ denotes the effective radius of the brake disk 20, $R_w$ denotes the wheel radius, $\mu_p$ denotes the friction coefficient between the brake pad 10 and the brake disk 20, and Kt means a proportional constant. In the present invention, the electronic parking brake (EPB) model for the dynamic braking is created using Equation 9 defining a relation between the braking command and the deceleration.

In order to calculate the command transmission time t when the braking command is transmitted in the electronic parking brake (EPB) model, a weight acting on the wheel of the vehicle 130, the friction force $F_p$ between the brake pad 10 and the brake disk 20, and factors (e.g. air resistance) that are not reflected in Equations 1 to 9 should be considered. However, since there is a limit to practically reflect all factors, according to the present invention, constants applied to the electronic parking brake (EPB) model are calculated based on Equations.

In the above-mentioned Equation 9, $$\frac{1}{K_t} \frac{WR_d}{\mu_p R_w}$$

is consequently the constant. This is substituted by constant $K_e$, and then the control value $K_e$ of the electronic parking brake may be represented by Equation 10.

$$t = K_e \Delta a \quad \text{[Equation 10]}$$

In the above-mentioned Equation 10, the control value $K_e$ of the electronic parking brake is a value that is converted into the constant considering the effective radius Rd of the brake disk 20, the wheel radius Rw, the friction coefficient μp between the brake pad 10 and the brake disk 20, the friction coefficient μb between the tire and the road, and the proportional constant Kt. That is, the control value $K_e$ may be a constant value representing the characteristics of the vehicle. However, the control value $K_e$ may be obtained by experiments without information about the vehicle. Further, $\Delta a$ is a value obtained by subtracting the vehicle deceleration from the target deceleration, and the target deceleration means the deceleration that should be reached so as to brake the vehicle. The command transmission time t may mean the duration of the braking command, which is required until the vehicle deceleration is identical to the target deceleration. The command transmission time t may be determined by multiplying the difference value Δa between the target deceleration and the vehicle deceleration and the control value $K_e$.

FIG. 3 is a view illustrating experimental data on a real vehicle for determining time that is required to achieve target deceleration by creating friction between the brake pad and the brake disk.

Referring to FIGS. 2 and 3, in the braking command of the electronic parking brake EPB, the following equations are satisfied: Apply(t)=+$K_e$Δa, and Release(t)=−$K_e$Δa. Thus, it can be seen that the transmission time of the braking command including the control value $K_e$ of the electronic parking brake is in proportion to the deceleration of the vehicle 130.

$$\text{Apply}(t) = +K_e \Delta a$$

$$\text{Release}(t) = -K_e \Delta a \qquad \text{[Equation 11]}$$

Therefore, as in the following Equation 12, the control value $K_e$ of the electronic parking brake may be represented by the transmission time of the braking command for an increase or reduction in deceleration. That is, in order to obtain the target deceleration, after the controller 110 generates the braking command, it may be determined how long the generated braking command is transmitted to the electronic parking brake 120. In this connection, the control value $K_e$ of the electronic parking brake is generated according to each of vehicles that are mass-produced and then is stored in the controller 110.

$$K_e = \frac{\text{Apply}(t)}{\Delta a} \text{ or } K_e = -\frac{\text{release}(t)}{\Delta a} \qquad \text{[Equation 12]}$$

Referring to FIG. 3, the braking command may include one of the brake application, the brake release, and the brake stop. In order to reduce the running speed of the vehicle 130, the brake application of the EPB is applied. In contrast, it can be seen that the running speed increases, if the brake release of the EPB is applied. Further, if a difference Δa between the deceleration of the vehicle 130 and the target deceleration is equal to "0", the braking of the EPB may stop. This will be represented by Equation 13.

if $(a_d > a)$ then $[\text{Apply}(t) = K_e(a_d - a)]$ if $(a_d < a)$ then $[\text{Release}(t) = -K_e(a_d - a)]$ if $(a_d = a)$ then [stop] $\qquad$ [Equation 13]

In the above-mentioned Equation 13, $a_d$ denotes the target deceleration, a denotes the current deceleration of the vehicle 130. That is, in the case of applying the target deceleration, the controller 110 transmits the braking command including the control value $K_e$ of the electronic parking brake to the electronic parking brake 120 until the current deceleration of the vehicle 130 becomes the target deceleration. Further, the electronic parking brake 120 causes the clamping force based on the control value $K_e$ of the electronic parking brake to be generated for a time (command transmission time) when the braking command is inputted. That is, the electronic parking brake 120 creates friction between the brake pad 10 and the brake disk 20, and generates a clamping force so that the deceleration of the vehicle 130 reaches the target deceleration, thus resulting in decelerating the vehicle 130. Consequently, the controller 110 may control the clamping force by controlling the command transmission time, and the variation of the clamping force may be in proportion to the command transmission time.

In the case of the brake application, as the command transmission time t increases, the variation of the clamping force in the positive direction may increase. That is, in the case of the brake application, as the command transmission time t increases, the variation in increase of the clamping force may increase. In the case of the brake release, as the command transmission time t increases, the variation of the clamping force in the negative direction may increase. That is, in the case of the brake release, as the command transmission time t increases, the variation in reduction of the clamping force may increase.

FIG. 4 is a view illustrating results of dynamic braking experiments using the electronic parking brake system according to the embodiment of the present invention.

Referring to FIGS. 2 and 4, the electronic parking brake 120 is controlled by the controller 110 that is operated based on Equations 12 and 13, and the results of dynamic braking experiments obtained by measuring the deceleration of the vehicle 130 are shown by the graph.

Under the conditions of the dynamic braking experiments, the target deceleration is set to 0.2 g. In this regard, at a time when the dynamic braking starts, the brake pad 10 is spaced apart from the brake disk 20 by a predetermined distance, thus causing a difference of 0.02 g between target deceleration (0.2 g) and average deceleration (0.18 g).

The difference of 0.02 g between target deceleration (0.2 g) and average deceleration (0.18 g) is irrelevant to the performance of the controller 110 and the electronic parking brake 120. As illustrated in FIG. 4, at the time of about 29.6 seconds, the brake pad 10 starts to come into contact with the brake disk 20, and then the deceleration of 0.2 g is maintained.

The command transmission time and the deceleration difference value Δa may be measured by the experiments, and the control value $K_e$ may be calculated by Equation 12. That is, it is possible to calculate the control value $K_e$ without the necessity of previously recognizing the information about the vehicle or acquiring all information through measurement. Thereby, it is possible to reduce time and cost required to tune the control value of the electronic parking brake 120.

The electronic parking brake system for the vehicle and the driving method thereof according to the embodiment of the present invention may set the control value $K_e$ of the electronic parking brake of each vehicle using Equation 12. As such, the control value $K_e$ of the electronic parking brake generated depending on the characteristics of each vehicle is stored in the controller 110, so that it is possible to reduce time and cost required to tune the control value of the electronic parking brake 120 of each vehicle.

Further, according to the embodiment of the present invention, it is possible to obtain the command transmission time by the control value representing the characteristics of the vehicle and the difference value between the target deceleration and the vehicle deceleration. The vehicle deceleration and the target deceleration are continuously checked through the command transmission time. Thus, the vehicle deceleration and the target deceleration are measured at the time when the control starts without the necessity of adjusting the clamping force, so that it is possible to control the electronic parking brake such that the target deceleration is identical to the vehicle deceleration.

FIG. 5 is a view illustrating a method of driving an electronic parking brake system according to an embodiment of the present invention.

Referring to FIGS. 2 and 5, it is determined whether the target deceleration $a_d$ is more than the vehicle deceleration a ($a_d$>a) at step S10. That is, the controller 110 may determine the type of the braking command by comparing the target deceleration $a_d$ with the vehicle deceleration a. Here, the control value $K_e$ may be stored in the controller 110. Further, the controller 110 may determine the command transmission time t through the difference value Δa between the target deceleration $a_d$ and the vehicle deceleration a and the control value $K_e$. If it is determined at step S10 that the target deceleration $a_d$ is more than the vehicle deceleration a, the controller 110 transmits the command of the brake application to the electronic parking brake 120 at step S20. The controller 110 may transmit the braking command to the parking brake 120 according to the type of the braking command and the command transmission time of the braking command that have been determined.

The vehicle is braked in the electronic parking brake 120 by the command of the brake application at step S30. At this time, the braking force may be generated for 100 ms.

On the other hand, if it is determined at step S10 that the target deceleration $a_d$ is not more than the vehicle deceleration a, it is determined that the target deceleration $a_d$ is less than the vehicle deceleration a ($a_d$<a) at step S40.

If it is determined at step S40 that the target deceleration $a_d$ is less than the vehicle deceleration a, the controller 110 transmits the command of the brake release to the electronic parking brake 120 at step S50.

On the other hand, if the target deceleration $a_d$ is not less than the vehicle deceleration a, the vehicle is braked in the electronic parking brake 120 by the command of the brake application at step S30.

After the command of the brake application or the command of the brake release is transmitted, it is determined whether the vehicle stops, at step S60. If the vehicle stops by the target deceleration, the driving of the electronic parking brake system is completed. Meanwhile, if the vehicle is not stopped, steps subsequent to step S10 are repetitively performed until the vehicle is stopped.

The electronic parking brake system for the vehicle and the method of driving the system according to the embodiment of the present invention allow the control value of the electronic parking brake to be set depending on the characteristics of the vehicle. Further, it is possible to reduce time and cost required to tune the control value of the electronic parking brake.

While the present invention has been described with respect to the specific embodiments, it will be apparent to those skilled in the art that various changes and modifications may be made without departing from the spirit and scope of the invention as defined in the following claims.

What is claimed is:

1. An electronic parking brake system for a vehicle, comprising:
a controller configured to output a braking command including a control value of a parking brake for decelerating the vehicle to a target deceleration; and
an electronic parking brake configured to generate a clamping force based on the braking command inputted from the controller,
wherein the controller controls a command transmission time required to transmit the braking command, thus determining the clamping force,
wherein the command transmission time is a period of time during which the braking command is maintained until a vehicle deceleration becomes identical to the target deceleration, and
wherein the control value of the electronic parking brake is generated using an effective radius of a brake disk, a radius of a wheel, a friction coefficient between a brake pad and the brake disk, and a friction coefficient between a tire and a road.

2. The electronic parking brake system according to claim 1, wherein the command transmission time is determined by multiplying a difference value between the target deceleration and the vehicle deceleration and the control value.

3. The electronic parking brake system according to claim 1, wherein a variation of the clamping force is in proportion to the command transmission time.

4. The electronic parking brake system according to claim 1,
wherein the control value of the electronic parking brake is stored in the controller.

5. The electronic parking brake system according to claim 1, wherein the braking command outputted from the controller comprises one of brake application, brake release or brake stop.

6. The electronic parking brake system according to claim 5, wherein, in the case of the brake application, a variation of the clamping force in a positive direction increases as the command transmission time increases, and
wherein, in the case of the brake release, a variation of the clamping force in a negative direction increases as the command transmission time increases.

7. The electronic parking brake system according to claim 5, wherein the controller applies the brake application when the vehicle is decelerated to the target deceleration, applies the brake release when the vehicle deceleration is reduced, and applies the brake stop when the vehicle deceleration is identical to the target deceleration.

8. A method of driving an electronic parking brake system for a vehicle, comprising:
obtaining a control value of a parking brake for decelerating the vehicle to a target deceleration;
determining a type of a braking command and a command transmission time of the braking command using a difference value between a vehicle deceleration and the target deceleration and the control value;
outputting the braking command according to the type of the braking command and the command transmission time of the braking command that have been determined; and
generating a clamping force in an electronic parking brake based on the braking command,
wherein the command transmission time is a period of time during which the braking command is maintained until the vehicle deceleration becomes identical to the target deceleration, and
wherein the control value of the electronic parking brake is generated using an effective radius of a brake disk, a radius of a wheel, a friction coefficient between a brake pad and the brake disk, and a friction coefficient between a tire and a road.

9. The method according to claim 8, further comprising outputting the braking command to the electronic parking brake until the vehicle deceleration becomes identical to the target deceleration by controlling the command transmission time.

10. The method according to claim 8, wherein, in the determining a type of a braking command, if the target deceleration is less than the vehicle deceleration, the type of the braking command is a brake release command, and if the target deceleration is more than the vehicle deceleration, the type of the braking command is a brake application command.

11. The method according to claim 8, wherein, in the determining a command transmission time of the braking command, the target deceleration is determined by multiplying the difference value of the vehicle deceleration and the obtained control value.

* * * * *